(12) United States Patent
Knudsen et al.

(10) Patent No.: US 10,680,894 B2
(45) Date of Patent: *Jun. 9, 2020

(54) DETECTING SOFTWARE MISCONFIGURATION AT A REMOTE MACHINE

(71) Applicant: Palantir Technologies Inc., Palo Alto, CA (US)

(72) Inventors: Jason Knudsen, Sunnyvale, CA (US); Christopher Brockington-Hill, London (GB); Jacek Lach, London (GB); Kawai Washburn, San Carlos, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/242,406

(22) Filed: Jan. 8, 2019

(65) Prior Publication Data

US 2019/0158359 A1    May 23, 2019

Related U.S. Application Data

(63) Continuation of application No. 15/705,442, filed on Sep. 15, 2017, now Pat. No. 10,218,574.

(60) Provisional application No. 62/537,345, filed on Jul. 26, 2017.

(51) Int. Cl.
    *H04L 12/24*    (2006.01)
(52) U.S. Cl.
    CPC ...... *H04L 41/0873* (2013.01); *H04L 41/0813* (2013.01); *H04L 41/22* (2013.01)

(58) Field of Classification Search
    CPC .................................................. H04L 41/08
    USPC ............................................................ 709/221
    See application file for complete search history.

(56) References Cited

U.S. PATENT DOCUMENTS

| | | | |
|---|---|---|---|
| 2011/0265064 A1* | 10/2011 | Hadar | G06F 8/36 |
| | | | 717/121 |
| 2015/0067399 A1 | 3/2015 | Jaroker | |
| 2016/0217054 A1 | 7/2016 | Hadar et al. | |
| 2017/0177461 A1* | 6/2017 | Altman | G06F 11/0706 |

OTHER PUBLICATIONS

"U.S. Appl. No. 15/705,442, Final Office Action dated Jul. 12, 2018", 20 pgs.
"U.S. Appl. No. 15/705,442, Non Final Office Action dated Dec. 14, 2017", 15 pgs.

* cited by examiner

*Primary Examiner* — Glenford J Madamba
(74) *Attorney, Agent, or Firm* — Schwegman Lundberg & Woessner, P.A.

(57) ABSTRACT

Aspects of the present disclosure relate to detecting software misconfiguration at a remote machine. A control server stores, in a data repository, a plurality of antipatterns, each antipattern relating to a misconfiguration of a remote computer system. The control server accesses data of the remote computer system. The control server runs the plurality of antipatterns on the data of the remote computer system to determine one or more misconfigurations of the remote computer system. The control server provides, as a digital transmission, an output representing the determined one or more misconfigurations of the remote computer system.

20 Claims, 6 Drawing Sheets

US 10,680,894 B2

DETECTING SOFTWARE MISCONFIGURATION AT A REMOTE MACHINE

PRIORITY CLAIM

This application is a continuation of, and claims priority to U.S. patent application Ser. No. 15/705,442, filed Sep. 15, 2017, entitled, "DETECTING SOFTWARE MISCONFIGURATION AT A REMOTE MACHINE," which claims priority to U.S. Provisional Patent Application No. 62/537,345, filed on Jul. 26, 2017, entitled "DETECTING SOFTWARE MISCONFIGURATION AT A REMOTE MACHINE," the entire content of which are incorporated herein by reference.

TECHNICAL FIELD

The subject matter disclosed herein relates to detecting software misconfigurations, performance problems, security issues, and the like at a remote machine. In particular, example embodiments may relate to detecting software misconfiguration at a remote machine by a control server.

BACKGROUND

A control server may be used to configure software at a remote machine. In some cases, that software may be misconfigured. For example, due to errors in installing or configuring the software at the remote machine. Detecting that the software was misconfigured and repairing the misconfiguration may require a technician to visit the remote machine, costing time or money.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
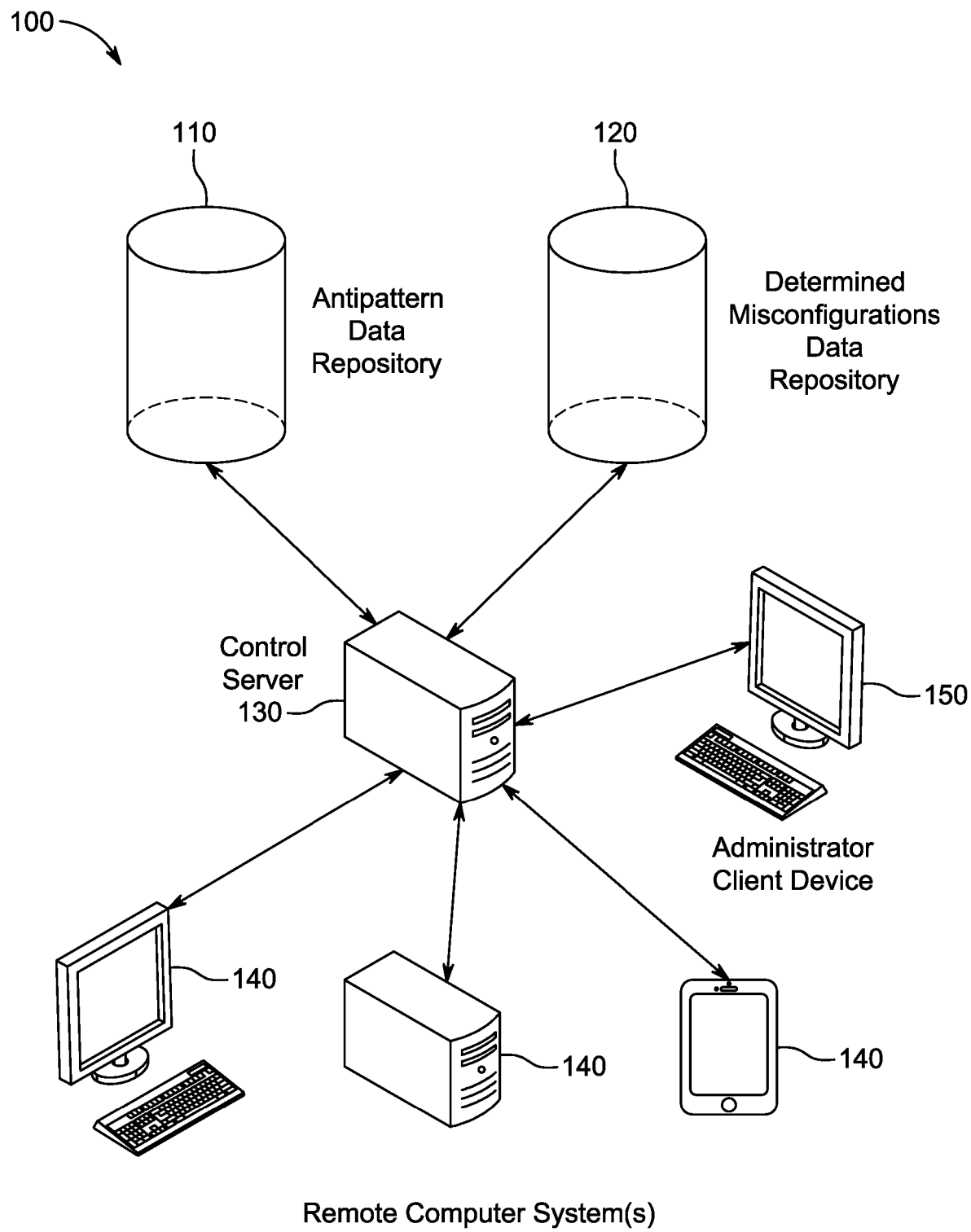
FIG. 1 is a block diagram of an example system in which detecting software misconfiguration may be implemented, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

As discussed above, a control server may be used to configure software at a remote computer system, which may include one or more physical or virtual machines. In some cases, that software may be misconfigured. Detecting software misconfiguration at the remote computer system may be desirable.

Aspects of the present disclosure relate to detecting software misconfiguration at a remote machine. A control server stores, in an antipattern data repository, a plurality of antipatterns. As used herein, an "antipattern" may include software that searches remote machine(s) for software misconfigurations, performance problems, security issues, and the like and returns an output representing the discovered software misconfigurations, performance problems, security issues, and the like. Each antipattern identifies a possible misconfiguration, performance problem, security issue, or the like of a remote computer system. An agent is installed on each remote server which is used to execute the antipattern checks and send the results back to the control server. The agent runs the plurality of antipatterns on the data of the remote computer system to determine one or more misconfigurations of the remote computer system. The control server provides, as a digital transmission, an output representing the determined one or more misconfigurations of the remote computer system. The digital transmission may be provided for storage in a determined misconfigurations data repository or for display at an administrator client device or at the remote computer system.

In some cases a programmer working at an administrator client device or at a remote computer system may program a new antipattern check (e.g., using the Python programming language), and the control server may store that new antipattern check in the antipattern data repository. The new antipattern check may be used, by the control server, to detect misconfiguration(s) at other remote computer system(s) (or at the remote computer system that provided the new antipattern check). Advantageously, in some aspects, the antipattern data repository can be configured (e.g., with new antipattern(s)) to check for new misconfiguration(s) that were unknown prior to the new antipattern(s) being added to the antipattern data repository.

An antipattern may include a script (e.g., in Python or another programming language) that includes the following: (1) a function that runs some form of a check, reviews configuration files, log files, system kernel settings, and the like in an attempt to detect potential problems, and (2) boilerplate code that wraps the function in an antipattern shell Application Programming Interface (API).

TABLE 1

Python Template Example for Antipattern

\# my_antipattern.py
"Verify that everything is fine, and that not everything is

TABLE 1-continued

Python Template Example for Antipattern

```
broken"
from abc.antipattern import run, report, debug, info, STATUS_OK,
STATUS_WARNING, STATUS_CRITICAL, STATUS_UNKNOWN
# the antipattern function
def my_antipattern( ):
    <verify assertions>
    if ok:
        report(STATUS_OK, "Everything is fine")
    else:
        report(STATUS_CRITICAL, "Everything is broken")
if __name__ == '__main__':
    result = run(my_antipattern,
        identifier="EVERYTHING.BROKEN",
        reason=__doc__)
```

Note the modular nature of the antipattern in Table 1. External modules (run, report, status constants) are common among some antipatterns. The antipattern developer is tasked with: (1) determining some indicator of misconfiguration/potential problems (e.g., transparent huge pages enabled); (2) determining how to detect this issue, for instance, with some operating system-level commands passed via a Python sub-process module (or a similar module in another programming language); (3) determining the identifier to use for the antipattern; (4) determining the implications of that antipattern, for example, as it maps to Status Codes; and (5) writing the code as a function (in some cases, this may be similar to the code in the my_antipattern Python function of Table 1, along with some boilerplate code).

In some cases, an antipattern.run wrapper sets up the environment, allowing the antipattern to query remote systems, and handles the command line interface for an antipattern. The wrapper takes a function (e.g., in Python), a string identifier—which identifies the antipattern allowing aggregate analysis, and a reason—which is a user-targeted string explaining the rationale for the antipattern (e.g., module doc-string).

Antipattern.report allows an antipattern to set its result, and, optionally, a user-facing message. The message is passed on to the user device. This call will throw an exception that is caught by the run, thus terminating execution of the function.

The info and debug modules provide for printing output to the user. Info is printed by default. Debug is not printed unless the user selects an appropriate setting.

In some cases, identifies of antipatterns are all-uppercase, dot-separated strings. The first segment may describe the category of this antipattern, for example POSTGRES for postgres-specific antipatterns, SYSTEM for system configuration assertions, INFOSEC for security-related ones, and the like. The second and further segments may identify the exact assertions being ran. For example ALPHA.CLUSTER_SIZE verifies that the cluster size is the expected number. Allowed characters for the identifiers may include uppercase letters, dots, and the underscore characters.

Antipatterns may reference status codes as integer constants mapped from an antipattern.status module. One example mapping of status codes to integer constants is shown in Table 2 and described in conjunction with Table 2 below.

FIG. 1 is a block diagram of an example system 100 in which detecting software misconfiguration may be implemented, according to some embodiments. As shown, the system 100 includes an antipattern data repository 110, a determined misconfigurations data repository 120, a control server 130, remote computer system(s) 140, and an administrator client device 150. The antipattern data repository 110, the determined misconfigurations data repository 120, the control server 130, the remote computer system(s) 140, and the administrator client device 150 may communicate with one another over a network, which may include one or more of the Internet, an intranet, a local area network, a wide area network, a wired network, a wireless network, an Ethernet network, a cellular network, a Wi-Fi® network, and the like.

The administrator client device 150 may be a laptop computer, a desktop computer, a mobile phone, a tablet computer, and the like, and may be used by an administrator of a software deployment. The software deployment may be deployed at the remote computer system(s) 140, which may include laptop computer(s), desktop computer(s), mobile phone(s), tablet computer(s), server(s), physical machine(s), virtual machine(s), and the like. Each remote computer system 140 may include one or more physical or virtual machines. According to some implementations, the antipattern data repository 110 stores multiple antipatterns. Each antipattern identifies a possible misconfiguration of one of the remote computer systems 140 (e.g., of the software deployment running at the remote computer system(s)). The antipatterns may be added to the antipattern data repository via the control server 130, in response to a prompt from a user of the administrator client device 150 or a user of one of the remote computer system(s) 140.

Agents on each remote computer system 140 run the multiple antipatterns stored in the antipattern data repository 110 on the data of the remote computer system 140 to determine one or more misconfigurations of the remote computer system 140. The agents transmit the determined one or more misconfigurations to the control server 130. The control server 130 provides, as a digital transmission, an output representing the determined one or more misconfigurations of the remote computer system 140. The digital transmission may be provided for storage in the determined misconfigurations data repository 120 or for display at the administrator client device 150 or at the remote computer system 140. More details of example operations of the control server 130 are provided in conjunction with FIG. 2.

Figure 3A:
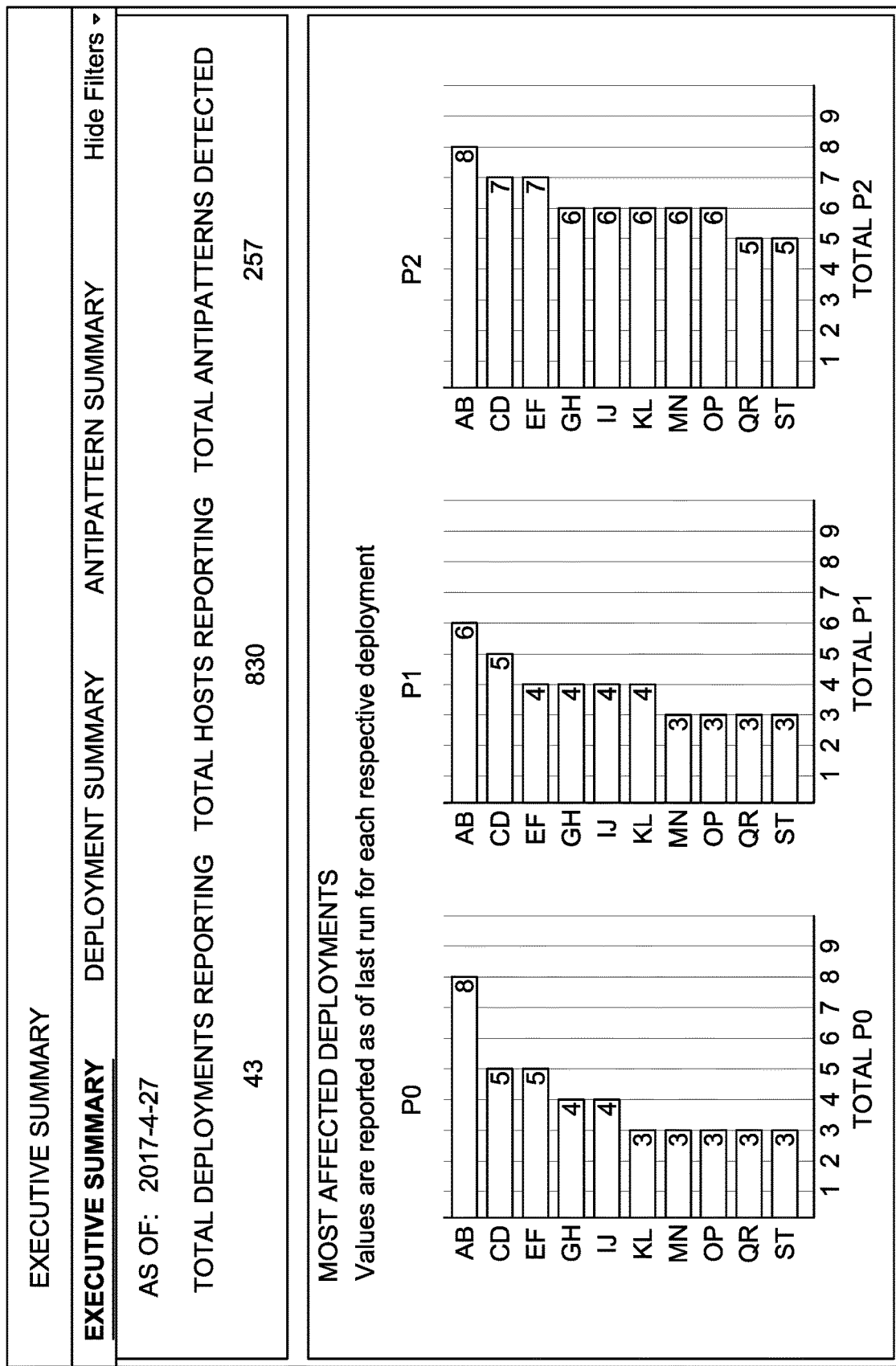
FIG. 3A illustrates an example executive summary interface, according to some embodiments.
Figure 3B:
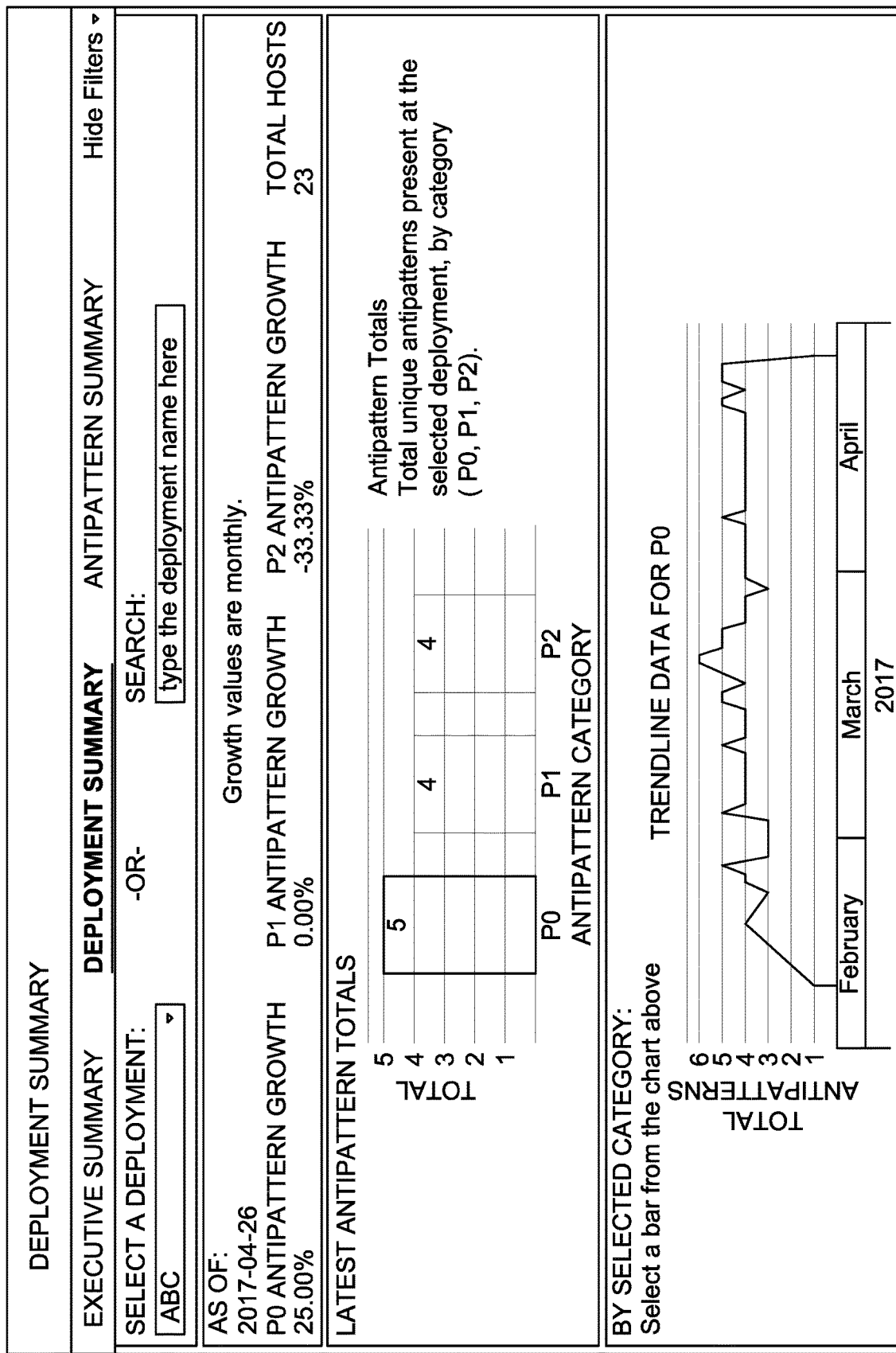
FIG. 3B illustrates an example deployment summary interface, according to some embodiments.
Figure 3C:
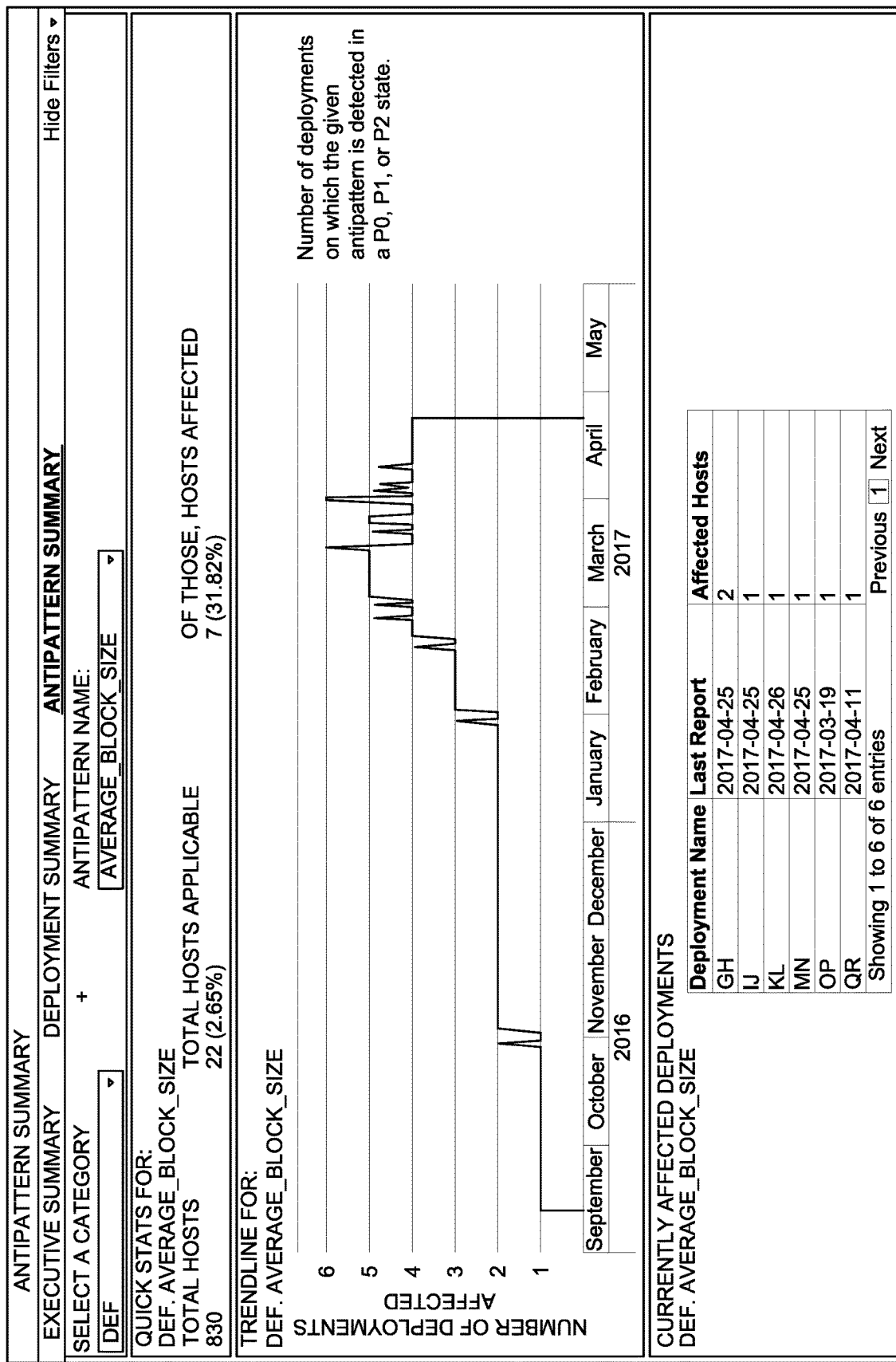
FIG. 3C illustrates an example antipattern summary interface, according to some embodiments.

Determined misconfigurations of the remote computer system(s) may be stored in the determined misconfigurations data repository 120, from where they may be accessed by the administrator client device 150 or other devices. The determined misconfigurations may be useful, for example, in creating updates or new versions of the software deployment. Data regarding the determined misconfigurations may be presented to an administrator via the administrator client device 150, for example, as shown in FIGS. 3A-3C and discussed below.

Figure 2:
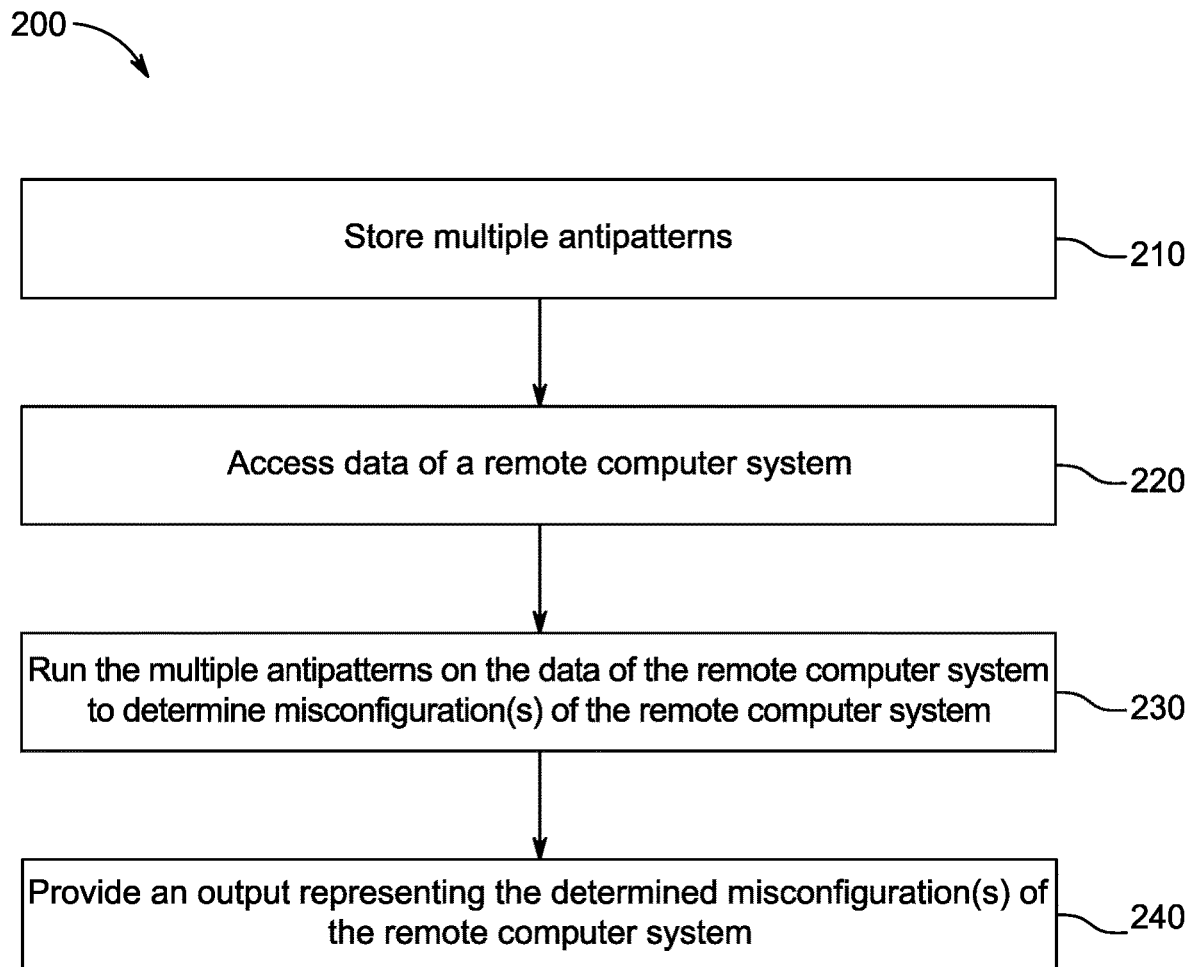
FIG. 2 is a flow chart illustrating an example method for detecting software misconfiguration, according to some embodiments.

FIG. 2 is a flow chart illustrating an example method 200 for detecting software misconfiguration, according to some embodiments. The method 200 may be implemented at the control server 130 or the agents of the remote computer systems 140 within the system 100, and is described herein as being implemented at the control server 130 or the agents of the remote computer systems 140. However, in alternative embodiments, the method 200 may be implemented at other machine(s) or within other system(s). The method 200 is not limited to being implemented at the control server 130 or the agents of the remote computer systems 140 as described herein.

At operation 210, the control server 130 stores and the agent accesses, in the antipattern data repository, multiple antipatterns. Each antipattern identifies a possible misconfiguration of a remote computer system 140. In some examples, each antipattern includes python code (or code in another programming language) to detect the misconfiguration of the remote computer system. The python code may include operating system-level commands passed via a python subprocess module.

At operation 220, the agent accesses data of the remote computer system 140. The accessed data of the remote computer system 140 may include one or more configuration file(s), log file(s), and system kernel setting(s) of the remote computer system 140.

At operation 230, the agent runs the multiple antipatterns on the data of the remote computer system 140 to determine misconfiguration(s) of the remote computer system 140. The antipatterns include software code for tests for determining and identifying misconfiguration(s) of the remote computer system 140. The antipatterns are related to possible misconfigurations. In some examples, each antipattern maps the data of the remote computer system to a numeric status code. In some examples, each antipattern includes python code to detect the misconfiguration of the remote computer system.

At operation 240, the agent provides, as a digital transmission, an output representing the determined misconfiguration(s) of the remote computer system. The determined misconfigurations may then be automatically or manually addressed or remediated. In some examples, each antipattern maps the data of the remote computer system to a numeric status code, and the output includes the numeric status codes corresponding to the data of the remote computer system. Example numeric status codes are shown in Table 2.

TABLE 2

| Numeric Status Codes |
| --- |
| OK = 0 |
| WARNING = 1 |
| CRITICAL = 2 |
| UNKNOWN = 3 |
| N/A = 10 |
| ERROR = 11 |
| EXCEPTION = 12 |
| WHITELISTED = 13 |

According to some examples, the output includes a notification to a user of the remote computer system 140 of the determined misconfigurations. According to some examples, the output representing the determined one or more misconfigurations of the remote computer system is stored in the determined misconfigurations data repository 120.

In some cases, a user of a remote computer system 140 may detect a misconfiguration of the remote computer system 140 and may write a new antipattern for determining the existence of the misconfiguration at other remote computer systems 140 (or the same remote computer system 140). The user may provide the new antipattern to the control server 130. The control server 130 receives, from the user of the remote computer system 140, the new antipattern. The control server 130 stores the new antipattern in the antipattern data repository 110. After the new antipattern is stored in the antipattern data repository 110, the new antipattern may be used (e.g., by repeating the method 200) to detect misconfigurations of the remote computer system(s) 140, along with the other antipatterns in the antipattern data repository 110.

According to some aspects, the agents are deployed as an agent to every sever via a deployment management system. The agent resides on each host and runs the antipattern checks once every threshold time period (e.g., once per day in the nighttime). The agent submits the results of the antipattern checks to the control server 130, which forwards the results to the determined misconfigurations data repository 120 and/or the administrator client device 150. The subject technology may be implemented via a push model (where results are pushed from the agents to the control server 130 and from the control server 130 to the determined misconfigurations data repository 120). Alternatively, manual runs of antipatterns may be triggered. The antipatterns may be run on the whole deployment or only on single host(s).

FIGS. 3A-3C illustrate example interfaces. The interfaces of FIGS. 3A-3C may be presented at the administrator client device 150 based on information stored in the antipattern data repository 110 and the determined misconfigurations data repository 120.

FIG. 3A illustrates an example executive summary interface, according to some embodiments. As shown, the interface of FIG. 3A indicates the total number of deployments, the total number of hosts, and the total number of antipatterns detected. A bar graph of the most affected deployments is also presented.

FIG. 3B illustrates an example deployment summary interface, according to some embodiments. The deployment summary includes an antipattern growth for each of three categories (P0, P1, and P2) of an antipattern. As shown, the category P0 is selected, and trendline data for that category P0, representing detections of the category P0 by the antipattern with respect to time, is presented.

FIG. 3C illustrates an example antipattern summary interface, according to some embodiments. As shown, the antipattern summary interface of FIG. 3C indicates a total number of hosts, a number of hosts to which the antipattern is applicable, and a number of hosts affected. The hosts may correspond to the remote computer systems 140. The interface of FIG. 3C also includes a trendline for the antipattern and a list of currently affected deployments. The trendline indicates a number of deployment on which the given antipattern is detected in a given state (e.g., P0, P1, or P2).

Figure 4:
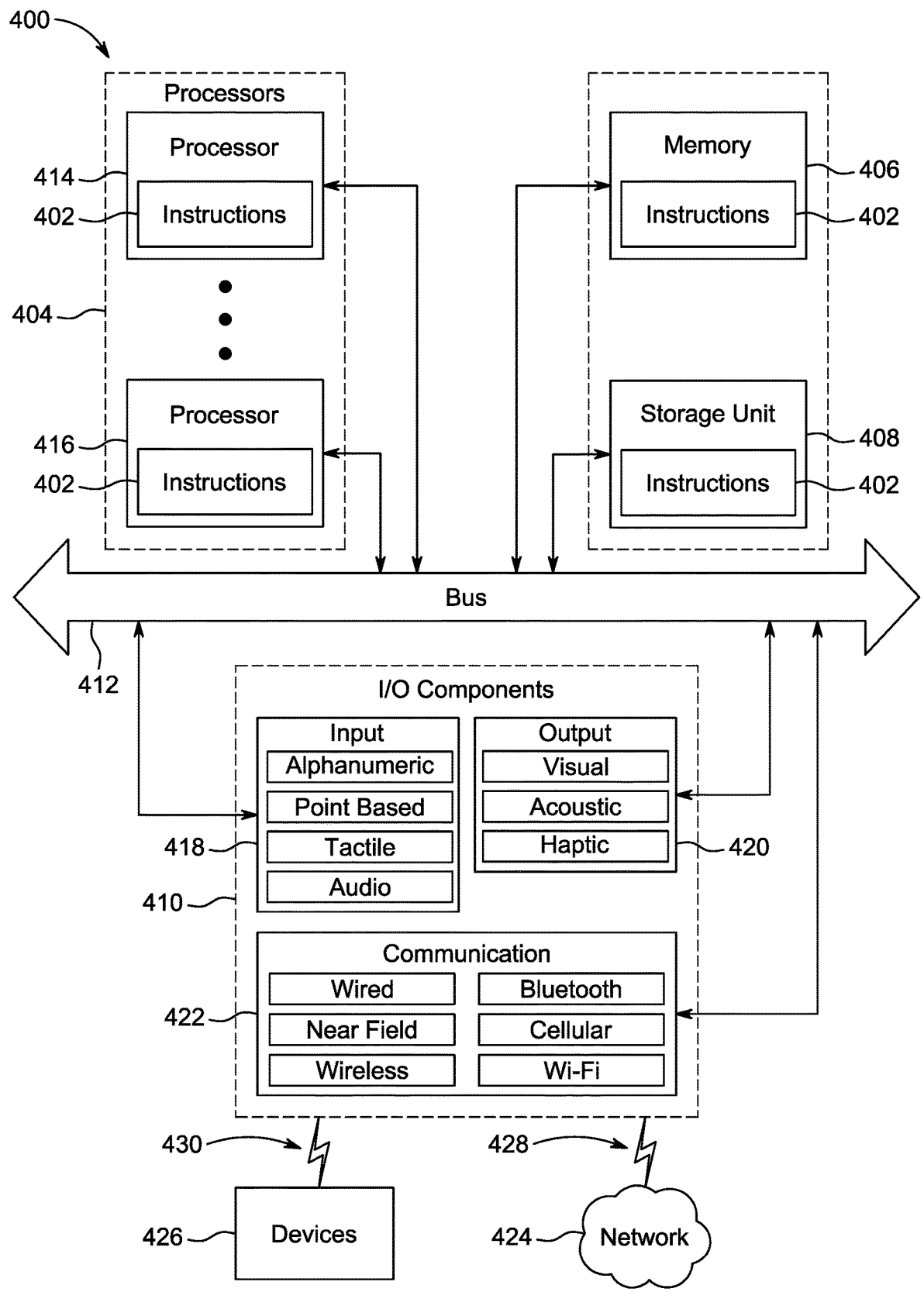
FIG. 4 is a block diagram illustrating components of a machine able to read and execute instructions from a machine-readable medium that cause the machine to perform any one or more of the methodologies discussed herein, according to some embodiments.

FIG. 4 is a block diagram illustrating components of a machine 400, according to some example embodiments, able to read instructions from a machine-readable medium (e.g., a machine-readable storage medium) and perform any one or more of the methodologies discussed herein. The machine 400 may correspond to one or more of the antipattern data repository 110, the determined misconfigurations data repository 120, the control server 130, the remote computer system(s) 140, and the administrator client device 150. Specifically, FIG. 4 shows a diagrammatic representation of the machine 400 in the example form of a system, within which instructions 402 (e.g., software, a program, an application, an applet, an app, a driver, or other executable code) for causing the machine 400 to perform any one or more of the methodologies discussed herein may be executed. For example, the instructions 402 include executable code that causes the machine 400 to execute the method 200. In this way, these instructions transform the general, non-programmed machine into a particular machine programmed to carry out the described and illustrated functions in the manner described herein. The machine 400 may operate as a standalone device or may be coupled (e.g., networked) to other machines.

By way of non-limiting example, the machine 400 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing the instructions 402, sequentially or otherwise, that specify actions to be taken by machine 400. Further, while only a single machine 400 is illustrated, the term "machine" shall also be taken to include a collection of machines 400 that individually or jointly execute the instructions 402 to perform any one or more of the methodologies discussed herein.

The machine 400 may include processors 404, memory 406, storage unit 408 and I/O components 410, which may be configured to communicate with each other such as via a bus 412. In an example embodiment, the processors 404 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 414 and processor 416 that may execute instructions 402. The term "processor" is intended to include multi-core processors that may comprise two or more independent processors (sometimes referred to as "cores") that may execute instructions contemporaneously. Although FIG. 4 shows multiple processors, the machine 400 may include a single processor with a single core, a single processor with multiple cores (e.g., a multi-core process), multiple processors with a single core, multiple processors with multiples cores, or any combination thereof.

The memory 406 (e.g., a main memory or other memory storage) and the storage unit 408 are both accessible to the processors 404 such as via the bus 412. The memory 406 and the storage unit 408 store the instructions 402 embodying any one or more of the methodologies or functions described herein. The instructions 402 may also reside, completely or partially, within the memory 406, within the storage unit 408, within at least one of the processors 404 (e.g., within the processor's cache memory), or any suitable combination thereof, during execution thereof by the machine 400. Accordingly, the memory 406, the storage unit 408, and the memory of processors 404 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 402. The term "machine-readable medium" shall also be taken to include any medium, or combination of multiple media, that is capable of storing instructions (e.g., instructions 402) for execution by a machine (e.g., machine 400), such that the instructions, when executed by one or more processors of the machine 400 (e.g., processors 404), cause the machine 400 to perform any one or more of the methodologies described herein (e.g., methods 200 and 400). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 410 may include a wide variety of components to receive input, provide output, produce output, transmit information, exchange information, capture measurements, and so on. The specific I/O components 410 that are included in a particular machine will depend on the type of machine. For example, portable machines such as mobile phones will likely include a touch input device or other such input mechanisms, while a headless server machine will likely not include such a touch input device. It will be appreciated that the I/O components 410 may include many other components that are not specifically shown in FIG. 4. The I/O components 410 are grouped according to functionality merely for simplifying the following discussion and the grouping is in no way limiting. In various example embodiments, the I/O components 410 may include input components 418 and output components 420. The input components 418 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. The output components 420 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 410 may include communication components 422 operable to couple the machine 400 to a network 424 or devices 426 via coupling 428 and coupling 430, respectively. For example, the communication components 422 may include a network interface component or other suitable device to interface with the network 424. In further examples, communication components 422 may include wired communication components, wireless communication components, cellular communication components, near field communication (NFC) components, Bluetooth® components (e.g., Bluetooth® Low Energy), WiFi® components, and other communication components to provide communication via other modalities. The devices 426 may be another machine or any of a wide variety of peripheral devices (e.g., a peripheral device coupled via a Universal Serial Bus (USB)).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A system comprising:
one or more processors; and
a memory comprising instructions which, when executed by the one or more processors, cause the one or more processors to perform operations comprising:
accessing a plurality of antipatterns, each antipattern relating to a possible misconfiguration of a remote computer system, each antipattern including software that searches the remote compute system for a misconfiguration and returns an output representing the misconfiguration discovered at the remote computer system;
running the plurality of antipatterns on the data of the remote computer system to determine one or more misconfigurations of the remote computer system; and
providing, as a digital transmission to at least a data repository and an administrator client device, an additional output representing the determined one or more misconfigurations of the remote computer system, wherein the additional output representing the determined one or more misconfigurations of the remote computer system is stored in the data repository, and wherein the additional output causes display, at the administrator client device, of an antipattern summary interface, the antipattern summary interface indicating a first number of hosts to which a given antipattern from the plurality of antipatterns is applicable and a second number of hosts impacted by the determined one or more misconfigurations.

2. The system of claim 1, wherein the first number of host include the remote computer system.

3. The system of claim 1, wherein the plurality of antipatterns are accessed from a data storage unit different from the data repository.

4. The system of claim 1, wherein the data of the remote computer system comprises one or more of: configuration files, log files, and system kernel settings.

5. The system of claim 1, wherein each antipattern maps the data of the remote computer system to a numeric status code, and wherein the additional output includes the numeric status codes.

6. The system of claim 1, wherein each antipattern comprises Python code to detect the one or more misconfigurations of the remote computer system.

7. The system of claim 6, wherein the Python code comprises operating system-level commands passed via a Python subprocess module.

8. The system of claim 1, wherein the additional output comprises a notification to a user of the remote computer system.

9. The system of claim 1, the operations further comprising:
receiving, from a user of the remote computer system, a new antipattern; and
storing the new antipattern in the data repository.

10. The system of claim 1, the operations further comprising:
remediating the one or more antipatterns.

11. A non-transitory machine-readable medium comprising instructions which, when executed by one or more processors of a machine, cause the one or more processors to perform operations comprising:
accessing a plurality of antipatterns, each antipattern relating to a possible misconfiguration of a remote computer system, each antipattern including software that searches the remote compute system for a misconfiguration and returns an output representing the misconfiguration discovered at the remote computer system;
running the plurality of antipatterns on the data of the remote computer system to determine one or more misconfigurations of the remote computer system; and
providing, as a digital transmission to at least a data repository and an administrator client device, an additional output representing the determined one or more misconfigurations of the remote computer system, wherein the additional output representing the determined one or more misconfigurations of the remote computer system is stored in the data repository, and wherein the additional output causes display, at the administrator client device, of an antipattern summary interface, the antipattern summary interface indicating a first number of hosts to which a given antipattern from the plurality of antipatterns is applicable and a second number of hosts impacted by the determined one or more misconfigurations.

12. The machine-readable medium of claim 11, wherein the first number of host include the remote computer system.

13. The machine-readable medium of claim 11, wherein the plurality of antipatterns are accessed from a data storage unit different from the data repository.

14. The machine-readable medium of claim 11, wherein the data of the remote computer system comprises one or more of: configuration files, log files, and system kernel settings.

15. The machine-readable medium of claim 11, wherein each antipattern maps the data of the remote computer system to a numeric status code, and wherein the additional output includes the numeric status codes.

16. The machine-readable medium of claim 11, wherein each antipattern comprises Python code to detect the one or more misconfigurations of the remote computer system.

17. The machine-readable medium of claim 16, wherein the Python code comprises operating system-level commands passed via a Python subprocess module.

18. A method comprising:
accessing a plurality of antipatterns, each antipattern relating to a possible misconfiguration of a remote computer system, each antipattern including software that searches the remote compute system for a misconfiguration and returns an output representing the misconfiguration discovered at the remote computer system;
running the plurality of antipatterns on the data of the remote computer system to determine one or more misconfigurations of the remote computer system; and
providing, as a digital transmission to at least a data repository and an administrator client device, an additional output representing the determined one or more misconfigurations of the remote computer system, wherein the additional output representing the determined one or more misconfigurations of the remote computer system is stored in the data repository, and wherein the additional output causes display, at the administrator client device, of an antipattern summary interface, the antipattern summary interface indicating a first number of hosts to which a given antipattern from the plurality of antipatterns is applicable and a second number of hosts impacted by the determined one or more misconfigurations.

19. The method of claim 18, wherein the first number of host include the remote computer system.

20. The method of claim 18, wherein the plurality of antipatterns are accessed from a data storage unit different from the data repository.

* * * * *